United States Patent
Gove

(10) Patent No.: US 10,565,749 B1
(45) Date of Patent: Feb. 18, 2020

(54) METHODS AND APPARATUS FOR EFFICIENTLY PROCESSING A GRAPH DATA STRUCTURE

(71) Applicant: Invincea, Inc., Fairfax, VA (US)

(72) Inventor: Robert Paul Gove, Reston, VA (US)

(73) Assignee: Invincea, Inc., Reston, VA (US)

(*) Notice: Subject to any disclaimer, the term of this patent is extended or adjusted under 35 U.S.C. 154(b) by 0 days.

(21) Appl. No.: 15/179,629

(22) Filed: Jun. 10, 2016

(51) Int. Cl.
*G06T 11/20* (2006.01)
*G06T 1/20* (2006.01)

(52) U.S. Cl.
CPC .............. *G06T 11/206* (2013.01); *G06T 1/20* (2013.01)

(58) Field of Classification Search
CPC ...... G06T 11/206; G06T 1/20; G06F 16/9024
USPC ........................................................ 345/440
See application file for complete search history.

(56) References Cited

U.S. PATENT DOCUMENTS

| | | | | |
|---|---|---|---|---|
| 9,710,544 B1* | 7/2017 | Smith | .................... | G06T 11/206 |
| 2006/0290697 A1* | 12/2006 | Madden | ................. | G06T 11/206 |
| | | | | 345/440 |
| 2009/0313267 A1* | 12/2009 | Girgensohn | ...... | G06F 17/30058 |
| 2010/0149186 A1* | 6/2010 | Gansner | ................ | G06T 11/206 |
| | | | | 345/440 |
| 2010/0277481 A1* | 11/2010 | Cao | ....................... | G06K 9/6224 |
| | | | | 345/440 |
| 2013/0187922 A1* | 7/2013 | Sexton | ................... | G06T 11/206 |
| | | | | 345/440 |
| 2013/0187941 A1* | 7/2013 | Noon | ....................... | G06T 11/60 |
| | | | | 345/589 |
| 2013/0229416 A1* | 9/2013 | Krajec | ................... | G06T 11/206 |
| | | | | 345/440 |
| 2015/0310643 A1* | 10/2015 | Rzeszotarski | ........... | G06T 13/20 |
| | | | | 345/440 |
| 2016/0171732 A1* | 6/2016 | Glover | .............. | G06F 17/30994 |
| | | | | 345/440 |

OTHER PUBLICATIONS

Alistair Morrison, et al, "Fast Multidimensional Scaling through Sampling, Springs and Interpolation," [online] Department of Computing Science, University of Glasgow, dated Mar. 2003 [retrieved on Jun. 10, 2016], retrieved from: http://www.dcs.gla.ac.uk/matthew/papers/JInfoVis.pdf.

Aaron Quigley, et al. "FADE: Graph Drawing, Clustering, and Visual Abstraction," [online]Proceedings of the 8th International Symposium on Graph Drawing, pp. 197-210, dated May 2002 [retrieved on Jun. 10, 2016], retrieved from: http://link.springer.com/chapter/10.1007/3-540-44541-2_19.

* cited by examiner

*Primary Examiner* — Chante E Harrison
(74) *Attorney, Agent, or Firm* — Cooley LLP

(57) ABSTRACT

In some implementations, a processor can compute a relationship graph to be visually rendered on a display. The processor can define a set of graphical nodes, and can randomly select a first subset of graphical nodes from the set of graphical nodes. The first subset of graphical nodes is less than the set of graphical nodes of the relationship graph. The processor can update a position for each graphical node from the first subset of graphical nodes based on a repulsion value between that graphical node from the first subset of graphical nodes and each graphical node from a second subset of graphical nodes from the set of graphical nodes. The processor can then render each graphical node from the set of graphical nodes based on the updated position for each graphical node from the first subset of graphical nodes.

26 Claims, 10 Drawing Sheets

METHODS AND APPARATUS FOR EFFICIENTLY PROCESSING A GRAPH DATA STRUCTURE

GOVERNMENT LICENSE RIGHTS

This invention was made with government support under contract no. H98230-15-C-0619 awarded by the Maryland Procurement Office. The government has certain rights in the invention.

BACKGROUND

Embodiments described herein relate generally to efficiently processing a graph data structure and more particularly to methods and apparatus for efficiently defining a graphical arrangement of nodes and links in a graph data structure.

In some known systems, nodes in a graph data structure can be displayed, such that a user can view a graphical representation of the graph data structure. Some known systems, however, use a large amount of computing resources and/or computing time to determine a graphical representation of the graph data structure, and/or can produce a graphical representation that is difficult to visually interpret. Such issues can be exacerbated as the number of nodes in the graph data structure increase (e.g., calculating a graphical representation of a graph data structure can be resource-intensive when there are thousands or more nodes in the graph data structure).

Accordingly, a need exists for methods and apparatus that can efficiently process a graph data structure, so as to display a graphical representation of the graph data structure that is understandable to a user viewing graph data structures including large numbers of nodes.

SUMMARY

In some implementations, a processor can compute a relationship graph to be visually rendered on a display. The processor can define a set of graphical nodes, and can randomly select a first subset of graphical nodes from the set of graphical nodes. The first subset of graphical nodes is less than the set of graphical nodes of the relationship graph. The processor can update a position for each graphical node from the first subset of graphical nodes based on a repulsion value between that graphical node from the first subset of graphical nodes and each graphical node from a second subset of graphical nodes from the set of graphical nodes. The processor can then render each graphical node from the set of graphical nodes based on the updated position for each graphical node from the first subset of graphical nodes.

DETAILED DESCRIPTION

Figure 1:
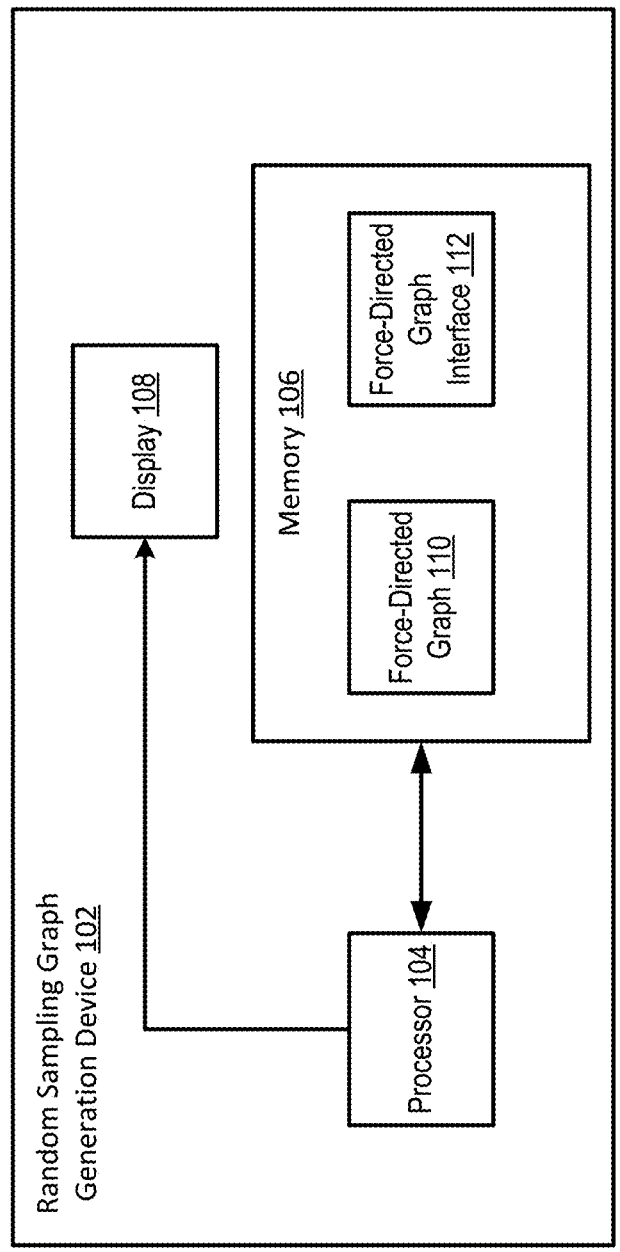
FIG. 1 is a schematic diagram illustrating a random-sampling graph generation device, according to an embodiment.

In some implementations, methods and apparatuses disclosed herein can generate a graph depicting relationships between various nodes in the graph. Nodes can be representative of many different things, including but not limited to data files, network devices and/or assets, and/or other data. As one example, in some implementations, a graph can represent a determination of how similar various assets and/or attributes of a data file (e.g., including images and/or icons, file names, file attributes, and/or other information) are to each other. At least a portion of the data files can be malware files and/or malicious files. The graph can be used to visually determine whether portions of a data file closely match portions of other data files in the graph which have been identified as malware. Attraction forces for each graph edge between the various graph nodes can be calculated. Additionally, repulsion forces can be calculated for each graph node. The forces can be used to determine how to display the graph nodes (e.g., to determine how close to display one graph node to another graph node, to determine how to cluster groups of graph nodes, and/or the like). In some instances graph nodes further apart can be less related to each other than nodes displayed close together. Thus, users can quickly and efficiently view associations between information represented by the graph nodes, using less data processing. For example, after a graph related to malicious files is graphically rendered on a display, the user can visually determine a relationship between malicious files and potentially-malicious files. A network system can then perform a network security-related action based on the determination (e.g., can quarantine files selected by the user based on the user's visual analysis of the graph, and/or the like).

In some implementations, an apparatus includes a memory and a processor operatively coupled to the memory. The processor can receive data used to compute a relationship graph to be visually rendered on a display communicatively coupled with the processor. The processor can define a set of graphical nodes each representing a unit of the data, and can randomly select a first subset of graphical nodes from the set of graphical nodes. A number of nodes in the first subset of graphical nodes is (1) based on a number of nodes in the set of graphical nodes and (2) less than the number of nodes in the set of graphical nodes. The processor can update a position change value for each graphical node from the first subset of graphical nodes based on a repulsion value between that graphical node from the first subset of graphical nodes and each graphical node from a second subset of graphical nodes from the set of graphical nodes. The processor can update, based on the position change value for each graphical node from the first subset of graphical nodes, a position value within the relationship graph of that graphical node. The processor can then render on the display the relationship graph with an arrangement of each graphical node from the set of graphical nodes based on the position value for each graphical node from the first subset of graphical nodes.

In some implementations, an example non-transitory processor-readable medium can store code representing instructions to be executed by a processor. The code can include code to cause the processor to receive data used to compute a relationship graph to be visually rendered on a display of a compute device. The code can further include code to define a set of graphical nodes each representing a unit of the data, and to assign a position within the relationship graph to each graphical node from the set of graphical nodes with respect to the remaining graphical nodes from the set of graphical nodes. The code can further include code to randomly select a first subset of graphical nodes from the set of graphical nodes. For each graphical node from the first subset of graphical nodes, the code can further include code to update a position change value for that graphical node from the first subset of graphical nodes based on a repulsion value between (1) that graphical node from the first subset of graphical nodes and (2) each graphical node from a second subset of graphical nodes from the set of graphical nodes. The code can further include code to update, based on the position change value for that graphical node from the first subset of graphical nodes, the position within the relationship graph of that graphical node to define an updated position within the relationship graph for that graphical node, and can include code to render on the display of the compute device the relationship graph with an arrangement of each graphical node from the set of graphical nodes based on the updated position within the relationship graph for each graphical node from the first subset of graphical nodes.

In some implementations, an example process can include repeatedly optimizing a visual rendering of a relationship graph having a set of edges and a set of graphical nodes until a criterion is satisfied based on iteratively performing other actions. For example, the process can include iteratively computing an attraction value for each edge from the set of edges. Each edge from the set of edges represents an association between two graphical nodes from the set of graphical nodes. Each graphical node from the set of graphical nodes is associated with a position change value and each graphical node from the set of graphical nodes represents a unit within the relationship graph. The process can include iteratively selecting a first subset of graphical nodes from the set of graphical nodes, and updating the position change value for each graphical node from the first subset of graphical nodes based on (1) the attraction value for each edge from the set of edges and associated with that graphical node from the first subset of graphical nodes and (2) a repulsion value between that graphical node from the first subset of graphical nodes and each graphical node from a second subset of graphical nodes from the set of graphical nodes. The process can include iteratively updating the position change value for each graphical node from the set of graphical nodes not within the first subset of graphical nodes based on the attraction value for each edge from the set of edges associated with that graphical node. The process can include iteratively updating, based on the position change value for each graphical node from the set of graphical nodes, a position value within the relationship graph of that graphical node. The process can include iteratively rendering, after the criterion is satisfied, on a display of a compute device the relationship graph with an arrangement of each graphical node from the set of graphical nodes based on the position value within the relationship graph for each graphical node from the set of graphical nodes.

As used herein, a module can be, for example, any assembly and/or set of operatively-coupled electrical components associated with performing a specific function, and can include, for example, a memory, a processor, electrical traces, optical connectors, software (executing in hardware) and/or the like.

As used herein, the singular forms "a," "an" and "the" include plural referents unless the context clearly dictates otherwise. Thus, for example, the term "module" is intended to mean a single module or a combination of modules. For instance, a "network" is intended to mean a single network or a combination of networks.

FIG. 1 is a schematic diagram illustrating a random-sampling graph generation device 102. For example, in some implementations, a random-sampling graph generation device 102 can be a device (e.g., a client electronic device, a server device, and/or a similar electronic device) that includes at least one processor 104, at least one memory 106, and/or at least one display 108. The at least one processor 104 can be any hardware module and/or component configured to receive and process data, and/or to execute code representing executable instructions. In some embodiments, the at least one processor 104 can be a general purpose processor, a Field Programmable Gate Array (FPGA), an Application Specific Integrated Circuit (ASIC), a Digital Signal Processor (DSP), and/or the like.

The at least one memory 106 can be a hardware module and/or component configured to store data accessible by the at least one processor 104, and/or to store code representing executable instructions for the at least one processor 104. The memory 106 can be, for example, a random access memory (RAM), a memory buffer, a hard drive, a database, an erasable programmable read-only memory (EPROM), an electrically erasable read-only memory (EEPROM), a read-only memory (ROM) and/or so forth. In some instances, the memory 106 stores instructions to cause the processor 104 to execute modules, processes and/or functions associated with a random-sampling graph generation device 102 and/or system.

The at least one processor 104 can be configured to execute instructions generated by modules and/or hardware components of the random-sampling graph generation device 102, and/or instructions stored in the memory 106. In some implementations, if the random-sampling graph generation device 102 includes multiple processors 104, the modules and/or hardware components can be distributed among and/or executed by the multiple processors 104. The at least one memory 106 can be configured to store processor-readable instructions that are accessible and executable by the processor 104. The at least one memory 106 can also be configured to store a data structure representing a force-directed graph 110 (e.g., a graph including a number of nodes that are distributed and/or displayed based on forces calculated between each of the nodes), and/or a force-directed graph interface 112 (e.g., a user interface instantiated so as to display a graphical and/or visual representation of the force-directed graph 110 on the display 108).

The at least one display 108 can be a device, such as a computer and/or mobile device screen, and/or a similar device configured to render graphical information, so as to allow a user to view said graphical information. For example, the at least one display 108 can be a liquid crystal display (LCD), a thin film transistor liquid crystal display (TFT-LCD), a light-emitting diode (LED) display, a cathode ray tube (CRT) display, and/or a similar display apparatus. The at least one display 108 can be operatively coupled to the at least one processor 104, and can be configured to render information sent by the at least one processor 104. For example, the at least one processor 104 can send a signal to the at least one display 108, including a representation of the force-directed graph 110. The at least one display 108 can be configured to render the representation of the force-directed graph 110. The at least one display 108 can also be configured to receive updated representations of the force-directed graphs 110, and to update the rendering of the representation of the force-directed graph 110 based on the updated representations of the force-directed graphs 110. In some implementations, the at least one display 108 can be a component of the random-sampling graph generation device 102. In other implementations, the at least one display 108 can be a component separate from, and operatively coupled to, the random-sampling graph generation device 102.

Figure 2:
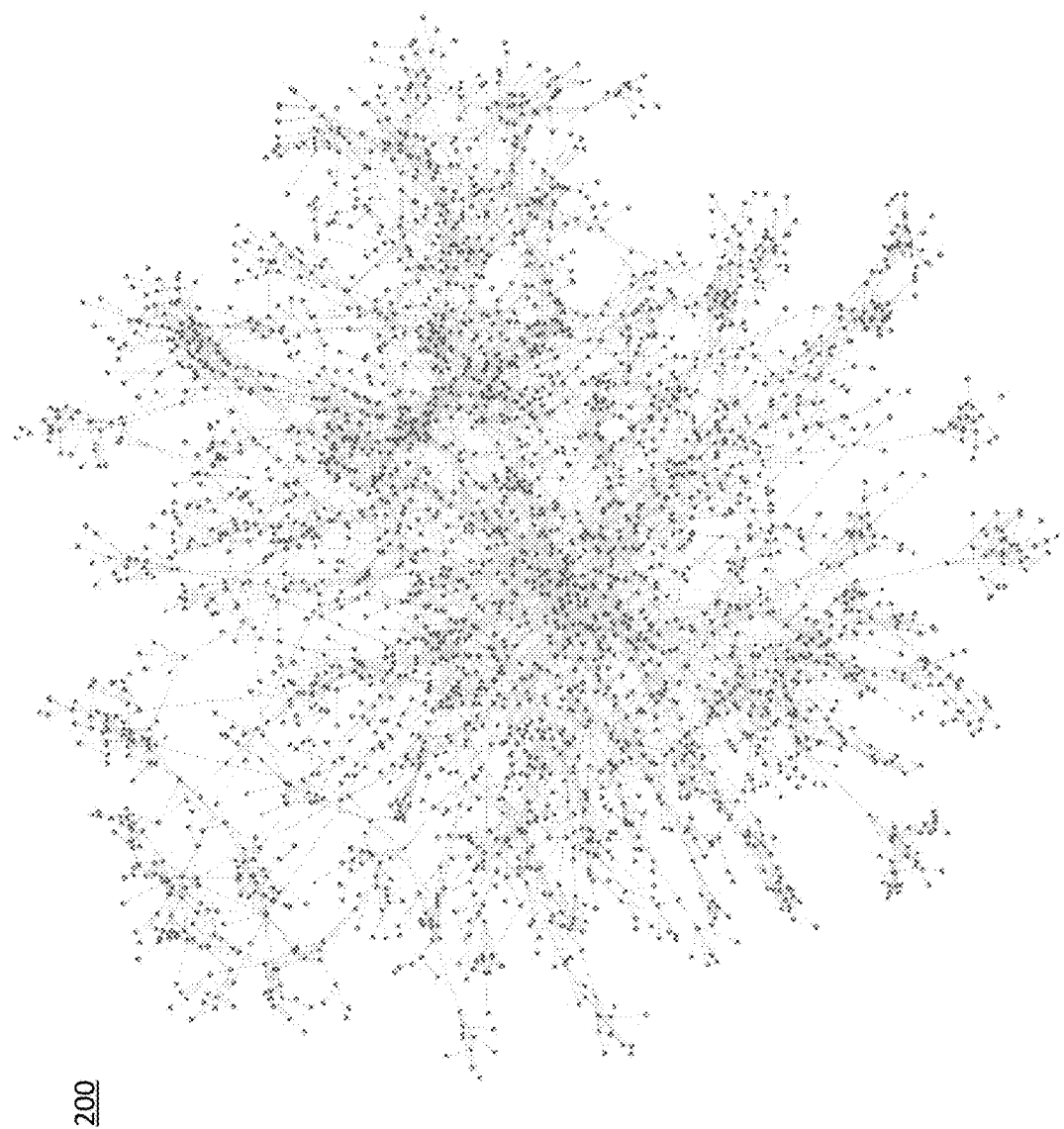
FIG. 2 is a schematic diagram illustrating a force-directed graph visualization, according to an embodiment.

FIG. 2 is a schematic diagram illustrating a force-directed graph visualization 200. For example, a graphical visualization of a force-directed graph 110 can allow a user to view relationships between multiple force-directed graph nodes. A force-directed graph can include any number of nodes, where each node can represent and/or be associated with network devices and/or assets, data (e.g., such as malware sample files, social network contacts, terms for use in natural language processing, and/or other classifiable and/or relational data), and/or other information. Each node in the force-directed graph can be connected to at least one other node in the force-directed graph via an edge (e.g., a reference and/or link to that other node in the force-directed graph). The random-sampling graph generation device 102 can display the force-directed graph so as to show relationships between the network nodes. Even when a force-directed graph 110 includes thousands of nodes or more, the force-directed graph 110 can allow users to determine nodes that are closely-related to each other, e.g., by visually showing nodes that are related in clusters within the force-directed graph 110. Further, nodes in the force-directed graph 110 can dynamically (e.g., substantially in real-time) move closer and/or further away from other nodes in the force-directed graph 110, based on new information calculated by and/or provided to the random-sampling graph generation device 102 (e.g., by the user and/or a similar entity). In this manner, users can also visualize how relationships between nodes in the force-directed graph 110 can change and/or evolve, based on subsequent calculations made with respect to the force-directed graph 110 data structure.

Figure 3:
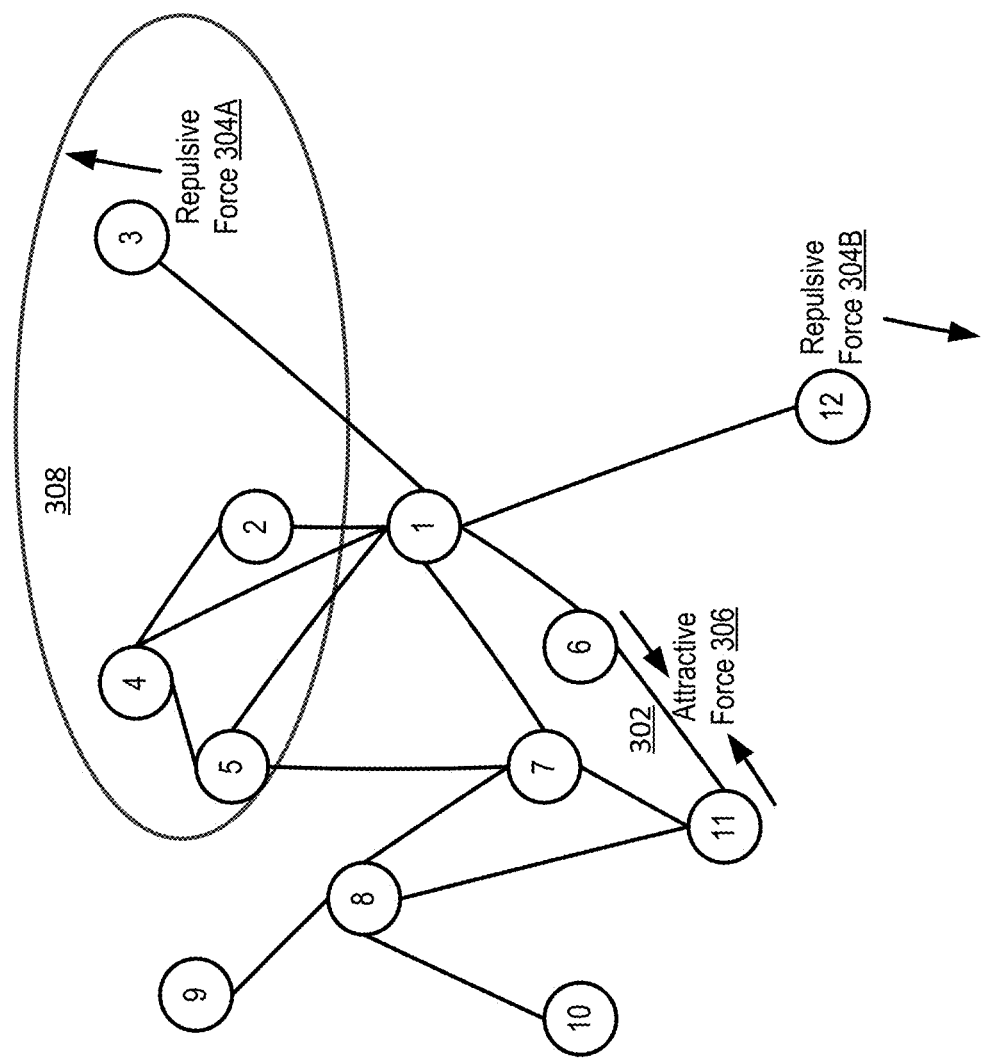
FIG. 3 is a schematic diagram illustrating force-directed graph forces, according to an embodiment.

More specifically, referring to FIG. 3, a force-directed graph 110 can include multiple nodes (e.g., nodes 1-12). Each node can represent and/or be associated with different information in the force-directed graph 110. As one example, nodes 6 and 11 can be connected by an edge 302. In some implementations, each node can be connected (e.g., by separate edges) to each other node in the force-directed graph 110 (e.g., the force-directed graph 110 can be a fully-connected graph data structure). In other implementations, each node is connected to a portion of the other nodes in the force-directed graph 110 (e.g., the force-directed graph 110 can be sparsely connected graph data structure). The edge 302 can be associated with a force weight. The force weight can indicate a magnitude of an attractive force being exerted between the two nodes 6 and 11. For example, if an attractive force weight 306 that is applied to an edge (e.g., such as the edge between nodes 6 and 11) is low, the attractive force weight 306 can indicate that the nodes are "attracted" to each other (e.g., that he information represented by the nodes is closely related), and therefore that the nodes can be depicted closer together in a graphical representation of the force-directed graph 110. In some implementations, the attractive force can be calculated with a version of a Hooke's law equation. Specifically, each edge can be treated as a spring between the two nodes with a spring constant. Based on the spring constant, the attractive force can bring the two nodes into an equilibrium distance between each other (subject to the repulsive forces between the nodes as described herein). In some instances, the attractive force (e.g., the spring constant) can be the same for each edge (e.g., all connections with a social network are treated equally). In other instances, the attractive force (e.g., the spring constant) can be different for each edge and based on any number of factors used to identify a relationship between the nodes connected by the edge.

In some implementations, each node in the force-directed graph 110 can also be affected by at least one repulsive force weight. For example, nodes 3 and 12 can each be associated with a repulsive force weight, such that each repulsive weight causes the nodes to be "repelled" from each other to a degree proportionate to the repulsive force weight. Thus, for example, if a repulsive force weight 304A is applied to node 3, and a repulsive force weight 304B is applied to node 12, the random-sampling graph generation device 102 can use the repulsive force weights of the two nodes to cause a graphical representation of the nodes to move the nodes further apart, so as to signify the degree to which the nodes "repel" each other (e.g., that the information represented by the nodes is not closely related). In some implementations, the random-sampling graph generation device 102 can treat and/or model each node as a charged particle and thus use a version of the Coulomb's law equation to calculate repulsive forces between nodes. Specifically, since similarly charged particles repel each other, the nodes can similarly repel each other. In some instances, each node in a graph is represented with a common weight (or charge). In such instances, each node will repel the other nodes equally. In other instances, different weights (or charges) can be assigned or calculated for each node based on that node's importance to the graph and/or any other suitable metric. Based on the attractive forces (e.g., edges linking the nodes) and the repulsive forces (e.g., the nodes repelling other nodes), a graph (similar to that shown in FIG. 3) can be derived.

In some implementations, to update force weights throughout the force-directed graph 110, a random selection of nodes 308 can periodically be selected, and force weights can be recalculated for each of the random selection of nodes 308. Force weights associated with an edge of a node (e.g., such as node 3) can be calculated based on a current position of node 3, a list of nodes associated with node 3 that includes nodes that are closest to node 3 (e.g., such as nodes 1 and/or 12), and/or based on similar information. Multiple random selections of nodes 308 can be computed, so as to iteratively refine the force-directed graph 110, as described in further detail herein.

Figure 4:
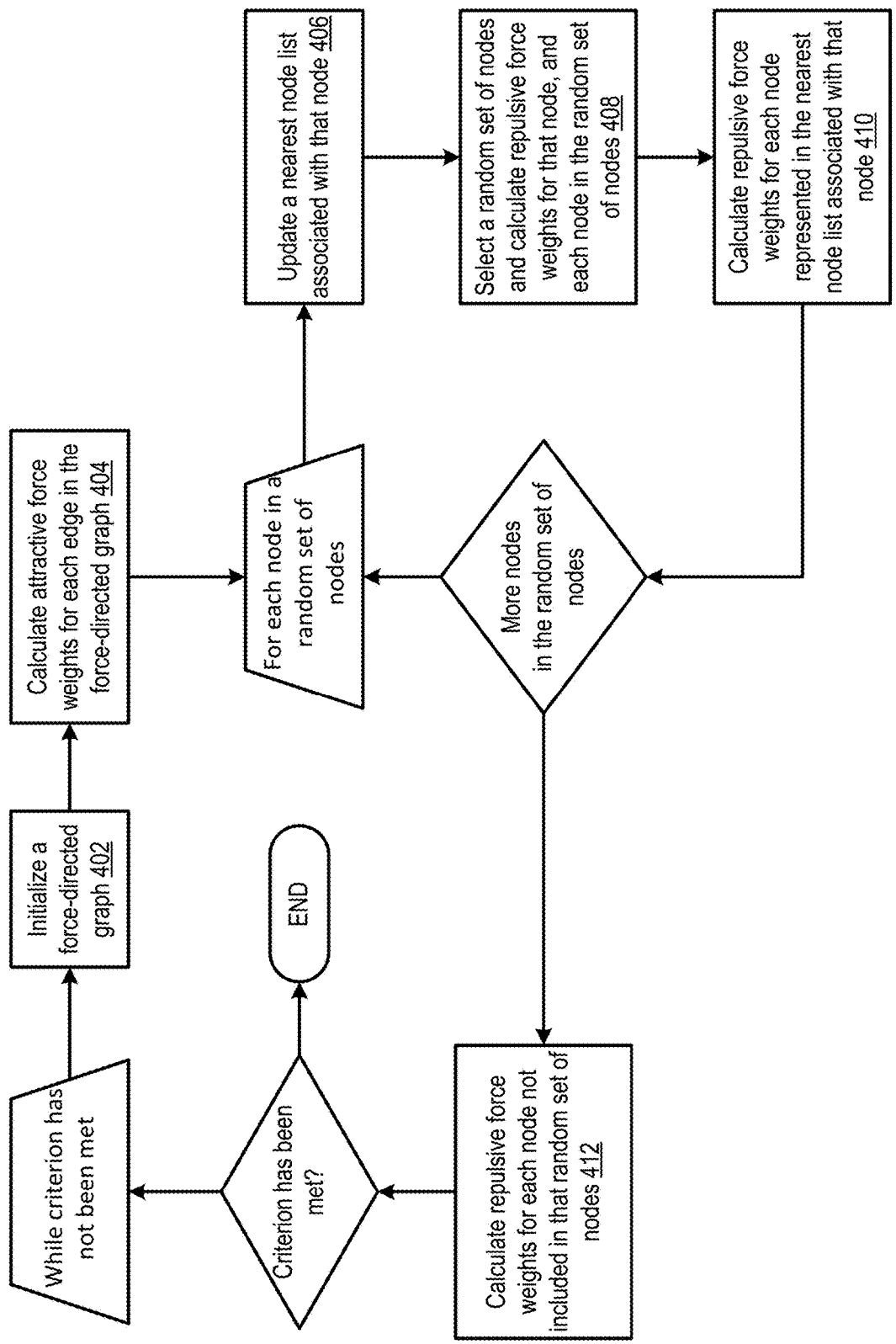
FIG. 4 is a logic flow diagram illustrating managing a force-directed graph, according to an embodiment.

FIG. 4 is a logic flow diagram illustrating a method of determining force weights and/or values in a force-directed graph 110. For example, in some implementations, the random-sampling graph generation device 102 can repeatedly perform a number of steps. For example, the random-sampling graph generation device 102 can initialize, at 402, a force-directed graph 110 by adding nodes, randomly assigning a position in the force-directed graph 110 for each node, and by initializing nearest node lists for each node (e.g., see at least FIG. 6 for more details). The random-sampling graph generation device 102 can calculate, at 404, attractive force weights (also referred to herein as attractive force values) for each edge within the force-directed graph 110 (e.g., for each connection between two nodes in the force-directed graph 110). The random-sampling graph generation device 102 can select a first random set of nodes for which to update repulsive forces. The random-sampling graph generation device 102 can, for each node in the first random set of nodes, update, at 406, the nearest node list of a particular node by determining whether a second random set of nodes not included in the nearest node list, are closer to that particular node than at least one of the nodes in the nearest node list of that particular node. That particular node can replace nodes in the nearest node list with nodes that are determined to be closer to that particular node. The random-sampling graph generation device 102 can then determine for each node from the first random set of nodes a third random set of nodes for which to calculate, at 408, repulsive force weights (also referred to herein as repulsive force values) with respect to that node from the first random set of nodes. The random-sampling graph generation device 102 can then update, at 410, repulsive force weights between the node from the first random set of nodes and each node in the nearest node list associated with that node from the first random set of nodes.

After the calculations are complete for each node from the first random set of nodes, the random-sampling graph generation device 102 can calculate, at 412, repulsive force weights for nodes not included in the first random set of nodes, as described in further detail herein. In some instances, the calculation of the repulsive force weights for each node not included in the first random set of nodes does not include a step similar to step 408. In such instances the calculation of the repulsive force weights for the nodes not included in the first random set of nodes is done based on a nearest node list, but not a selection of a third random set of nodes, as described in further detail herein.

The random-sampling graph generation device 102 can iteratively repeat these steps with multiple nodes, and with multiple subsequent randomly-selected sets of nodes, until at least one criterion has been met (e.g., until a portion and/or each of the nodes in the force-directed graph 110 does not update its nearest node list after a predetermined number of repetitions, until the repulsive force weights of a portion and/or each of the nodes in the force-directed graph converge, after a number of iterations reaches a threshold, and/or similar criteria). The resulting force-directed graph 110 can be displayed for a user to view data represented by the nodes in the force-directed graph 110, and such that a user can interact with the force-directed graph 110 (e.g., can modify nodes in the force-directed graph 110, and/or the like).

Figure 5:
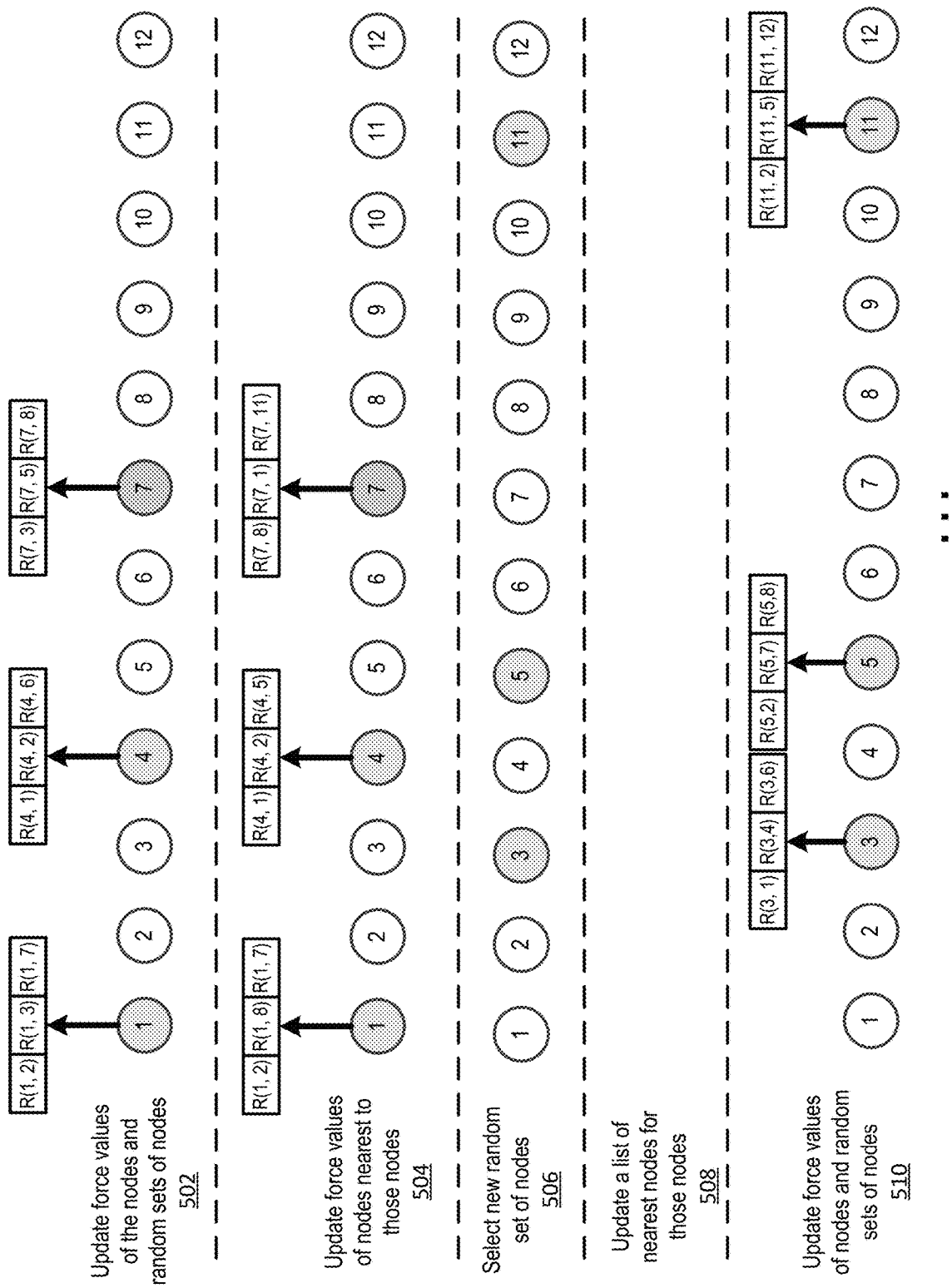
FIG. 5 is a diagram illustrating calculating forces, according to an embodiment.

FIG. 5 is a diagram illustrating calculating repulsive forces for nodes for each iteration (e.g., as described with respect to FIG. 4). For example, in some implementations, for each iteration, the random-sampling graph generation device 102 (e.g., via the at least one processor 104) can select a random selection of nodes (e.g., nodes 1, 4, and 7 for this iteration). In some implementations, the number of nodes in the random selection of nodes can be the whole number obtained by rounding down the square root of a total number of nodes in the force-directed graph 110 (e.g., which would be 3 in this instance after rounding down the square root of 12), and/or another value less than the total number of nodes in the force-directed graph 110 (e.g., a predetermined number of nodes, a predetermined fraction or percentage of the nodes, etc.). Each node selected for the random selection of nodes can be independently selected (e.g., each node in the random selection of nodes need not be selected based on any other node in the random selection of nodes). After the random selection of nodes has been selected, the random-sampling graph generation device 102 can, for each node, update a list of nearest nodes associated with that node.

The random-sampling graph generation device 102 can update, at 502, repulsive forces of randomized sets of nodes. For example, for node 1, the random-sampling graph generation device 102 can select a random set of nodes (e.g., nodes 2, 3, and 7 for randomly selected node 1), such that the number of nodes in the random set of nodes is less than the total number of nodes in the force-directed graph 110 (e.g., the number of nodes in the random set of nodes can be equal to a square root of the total number of nodes in the force-directed graph 110, rounded up or down). In some implementations, the nodes in the random set of nodes can be independently selected (e.g., selected independently from the random selection of nodes (1, 4, and 7 in this example). In other implementations, the nodes in the random set of nodes can be each node of the original random selection of nodes (e.g., the random set of nodes for node 1 can be 4 and 7, the random set of nodes for node 4 can be node 1 and 7, and/or the like).

For each node in the random set of nodes selected for that node, the random-sampling graph generation device 102 can update a repulsive force value of that node (e.g., can calculate an updated repulsive force value between node 1 and each of, node 2, node 3, and node 7). Similarly, for another example, for node 4, the random-sampling graph generation device 102 can select nodes 1, 2 and 6 and update the repulsive force value between node 4 and nodes 1, 2 and 6. For yet another example, for node 7, the random-sampling graph generation device 102 can select nodes 3, 5 and 8 and update the repulsive force value between node 7 and nodes 3, 5 and 8. In some implementations, the random set of nodes (e.g., the random set of nodes for node 1) can include at least one of the other nodes in the force-directed graph 110 (e.g., can include at least one of nodes 2-12).

The random-sampling graph generation device 102 can then update, at 504, the repulsive force value of nodes that are nearest to that node. For example, node 4 can be associated with a list of nodes (e.g., an array or vector) believed to be closest to node 4, and which can include nodes 1, 2, and 5. The random-sampling graph generation device 102 can then calculate repulsive force values between node 4 and each of nodes 1, 2, and 5. Each of the calculated force values (both calculated at step 402 and calculated at step 404) can be used to update a position update vector (e.g., distance and angle, or x movement distance and y movement distance) to move the position of the respective randomly selected nodes (e.g., nodes 1, 4 and 7) in the force-directed graph 110. This vector can be used to update position values for the nodes in the random selection of nodes.

For the next iteration, the random-sampling graph generation device 102 can select, at 506, a new random selection of nodes (e.g., nodes 3, 5, and 11 in this example). The random-sampling graph generation device 102 can, similar to the first iteration, update 508 a list of nearest nodes for the nodes in the new random selection of nodes (e.g., by determining whether any distances between nodes 3, 5, and 11, and the other nodes in the force-directed graph 110 have changed, such that any of nodes 3, 5, and 11 have moved closer to a first node, than to a second node already in that node's list of nearest nodes). For example, for node 5, if the list of nearest nodes for node 5 include nodes 1 and 7, and the random-sampling graph generation device 102 determines that node 5 has moved close enough to node 4 such that node 5 is now closer to node 4 than to node 7 (e.g., by randomly selecting node 4 and comparing a distance between node 5 and node 4, to the distance between node 5 and node 7), the random-sampling graph generation device 102 can update the nearest node list of node 5 by replacing node 7 with node 4.

The random-sampling graph generation device 102 can then update, at 510, the repulsive force values between the nodes in the new random selection of nodes, and the nodes in additional random sets of nodes selected for each of the nodes in the new random selection of nodes. For example, for randomly selected node 3, nodes 1, 4 and 6 can be selected and the repulsive force values between node 3 and nodes 1, 4, and 6 can be calculated. Similarly, for another example, for randomly selected node 5, nodes 2, 7 and 8 can be selected and for randomly selected node 11, nodes 2, 5 and 12 can be selected. The repulsive forces between node 5 and nodes 2, 7 and 8, and between node 11 and nodes 2, 5, 12 can then be calculated. While not shown in FIG. 4, the repulsive force values between nodes 3, 5 and 11 and the nodes in their associated nearest node lists can be calculated (similar to step 504 for nodes 1, 4 and 7). The repulsive force values can then be used to update a position update vector (e.g., distance and angle, or x movement distance and y movement distance) to move the position of the respective randomly selected nodes in the force-directed graph 110.

While not shown or described with respect to FIG. 4, in some instances the position in the force-directed graph 110 of nodes not selected as the random set of nodes (e.g., nodes 2, 3, 5, 6 and 8-12 in steps 502-504, and nodes 1, 2, 4, 6-10 and 12 in steps 506-510) can be updated based on the previously defined value of the position update vector associated with those nodes. For example, if node 6 was not selected as a random node in a previous iteration, node 6's position would be updated based on an initially defined position update vector (e.g., as initialized) for the iterations until node 6 is randomly selected. For another example, for the iteration of steps 506-510 (i.e., the iteration that selects nodes 3, 5 and 11 as the randomly selected nodes), node 1's position can be updated based on the position update vector updated in the iteration including steps 502-504 (i.e., the iteration that selected nodes 1, 4 and 7). Thus, in such an example, node 1's position would move the same amount in the same direction based on repulsive forces in both iterations.

The random-sampling graph generation device 102 can continue to repeat the process outlined by 504-510 until some predetermined criterion and/or set of criteria have been met. In this manner, instead of repeatedly calculating updated repulsive force values for each node in the force-directed graph 110 (which can be resource- and time-intensive), random-sampling graph generation device 102 can update a random set of nodes (the number of nodes being less than the total number of nodes in the force-directed graph 110), and can substantially reduce the amount of data processed, and/or the amount of time used to process each of the nodes, while adjusting the repulsive force values within the force-directed graph 110.

Figure 6:
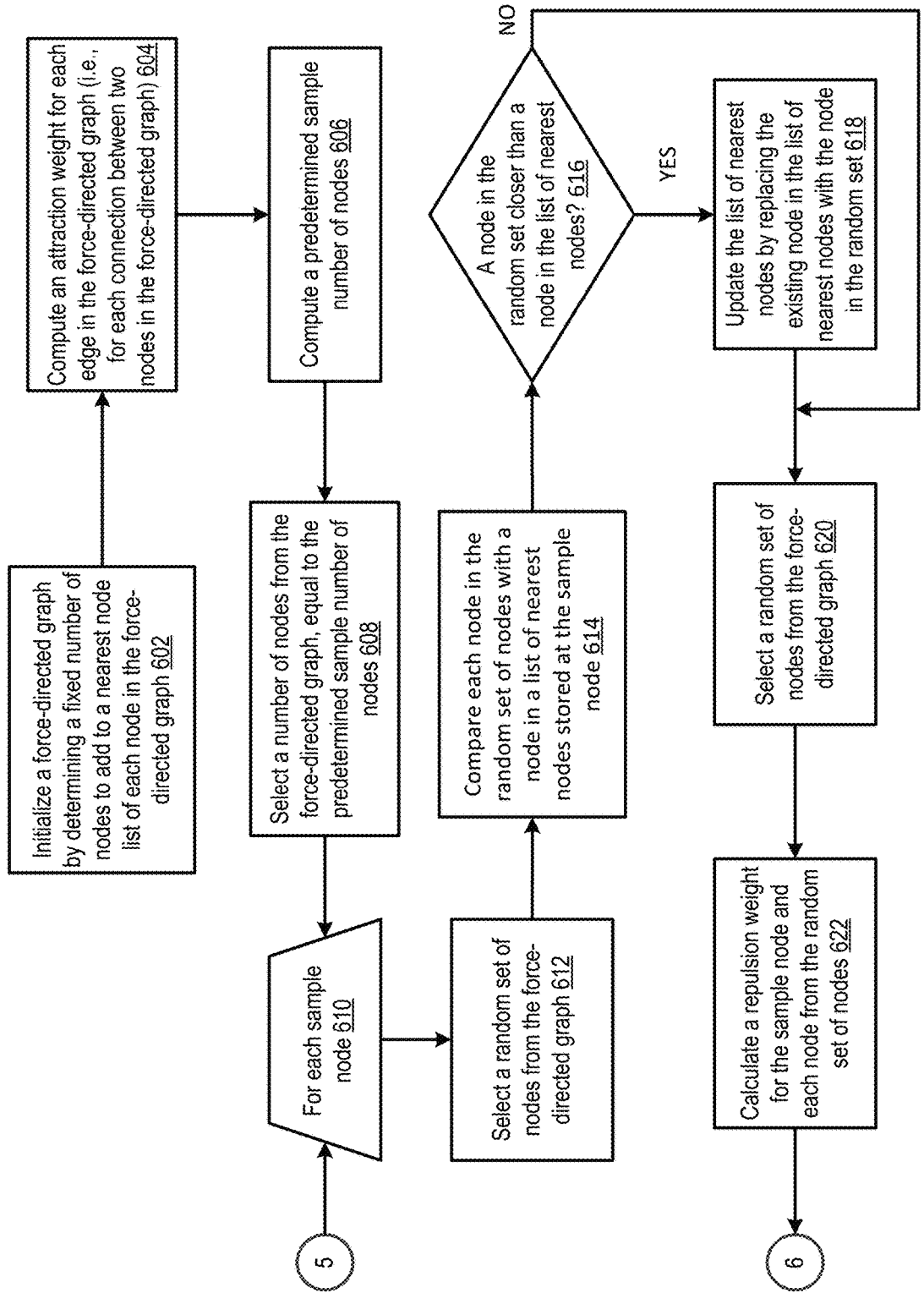
FIGS. 6 and 7 illustrate a logic flow diagram for calculating forces, according to an embodiment.

FIG. 6 is a logic flow diagram illustrating calculating forces. For example, in some implementations, example pseudocode for initializing and updating a force-directed graph 110 can resemble the following (as described in further detail with respect to FIG. 5):

```
function initialize ( ){
    for (i=0; i < nodes.length; i++){
        nodes.nearest = getRandomNodes(20);
        node.x = Math.random( );
        node.y = Math.random( );
        node.vx = 0;
        node.vy = 0;
    }
}
function update ( ){
    edges.forEach(computeAttraction);
    [sqrt nNodes, remainingNodes] =
        shuffleAndPartition(nodes);
    sqrt_nNodes.forEach(computeSampleRepulsion);
    remainingNodes.forEach(computeConstantRepulsion);
}
function computeSampleRepulsion(node){
    node.vx = 0;
    node.vy = 0;
    updateNearestNodes(node.nearest);
    randNodes = getRandomNodes(sqrt(n));
    for (i = 0; i < randNodes.length; i++){
        node.vx += computeXRepulsion(node, randNodes[i]);
        node.vy += computeYRepulsion(node, randNodes[i]);
    }
    for (i = 0; i < node.nearestNodes.length; i++){
        node.vx += computeXRepulsion(node,
            node.nearestNodes[i]);
        node.vy += computeYRepulsion(node,
            node.nearestNodes[i]);
    }
    node.x -= node.vx;
    node.y -= node.vy;
}
function computeConstantRepulsion(node){
    updateNearestNodes(node.nearest);
    for (i = 0; i < node.nearestNodes.length; i++){
        node.vx += computeXRepulsion(node,
            node.nearestNodes[i]);
        node.vy += computeYRepulsion(node,
            node.nearestNodes[i]);
    }
    node.x -= node.vx;
    node.y -= node.vy;
}
```

In some implementations, for example, the random-sampling graph generation device 102 can (e.g., via the at least one processor 104) initialize, at 602, a node graph by determining a fixed number of nodes to add to a nearest nodes list for each node. For example, as noted in the above initialize function, for each node, the random-sampling graph generation device 102 can select 20 random nodes for that node's list of nearest nodes. The random-sampling graph generation device 102 can also compute random position values for the node, and can initialize a position update vector for that node to [0,0]. Said another way, the random-sampling graph generation device 102 can compute a random Cartesian coordinate, and/or a coordinate of a different dimension, for the node, for rendering a representation of the node on a display. The random-sampling graph generation device 102 can also initialize a position update vector of the same dimension to zero (or any other suitable value). The position update vector can keep track of how far the node moves from the computed Cartesian coordinate, e.g., based on calculated force weights. After initializing the nodes, the position of the nodes can be iterative updated (e.g., by iteratively executing the update function described above).

In some implementations, the random-sampling graph generation device 102 can compute, at 604, an attraction weight for each edge in the force-directed graph 110 (e.g., can calculate an attraction weight for each connection between two nodes in the force-directed graph 110), as described above. In some instances, this can be done by executing computeAttraction function for each edge, as called by the update function described above. In some instances, the attraction weight can be used to update the position update vector for each node associated with an edge. The random-sampling graph generation device 102 can compute, at 606, a predetermined sample number of nodes (e.g., a number of nodes to be randomly-selected for updating), and can randomly select, at 608, a number of nodes from the force-directed graph 110 that is equal to the predetermined sample number of nodes (e.g., by executing the shuffleAndPartition(nodes) function, as called by the update function described above). In some implementations, the number can be less than the total number of nodes in the force-directed graph 110 (e.g., a square root of the number of nodes in the force-directed graph 110, rounded up or down, a fraction or percentage of the number of nodes in the force-directed graph 110, and/or a similar value). For each sample node in the set of sample nodes that was randomly selected, at 610, the random-sampling graph generation device 102 can update repulsive forces (e.g., by calling the computeSampleRepulsion function for each node). In some instances, the position vector is initialized to zero each time a node is selected at 610 (e.g., node.vx=0 and node.vy=0 in the computeSampleRepulsion function described above). The random-sampling graph generation device 102 can then select, at 612, a random set of nodes from the force-directed graph 110, the random set of nodes not including that sample node.

The random-sampling graph generation device 102 can calculate a distance between that sample node and each of the nodes in the random set of nodes (e.g., can calculate a Euclidian distance, and/or a similar distance, between the two nodes), and can compare, at 614, the distance between that sample node and each of the nodes in the random set of nodes, to distances between that sample node and each node in a list of nearest nodes associated with at that sample node. When a node in the random set of nodes is closer to that sample node than a node in the list of nearest nodes, at 616, (e.g., when a distance between the node in the random set of nodes and that sample node, is less than the distance between that sample node and a node in the list of the nearest nodes), the random-sampling graph generation device 102 can update, at 618, the list of nearest nodes of that sample node by replacing the node in the list of nearest nodes with the closer node in the random set of nodes. In this manner, the random-sampling graph generation device 102 can update the list of nearest nodes associated with that sample node, so as to efficiently determine whether or not the nodes in the list of nearest nodes are currently the closest nodes to that sample node (e.g., by calling the updateNearestNodes (node.nearest) function from the computeSampleRepulsion function).

The random-sampling graph generation device 102 can then select, at 620, another random set of nodes from the force-directed graph 110 (e.g., as shown above as randNodes=getRandomNodes(sqrt(n))), and can calculate, at 622, a repulsion weight between the sample node (i.e., selected at 610) and each randomly selected node selected at 620. For example, in some implementations, the random-sampling graph generation device 102 can move each node in the random set of nodes to a random sampling array, and can calculate repulsion weights between the sample node (i.e., selected at 610) and each node in the random sampling array (e.g., as shown above as computeXRepulsion(node, randNodes[i]); and computeYRepulsion(node, randNodes[i])).

Figure 7:
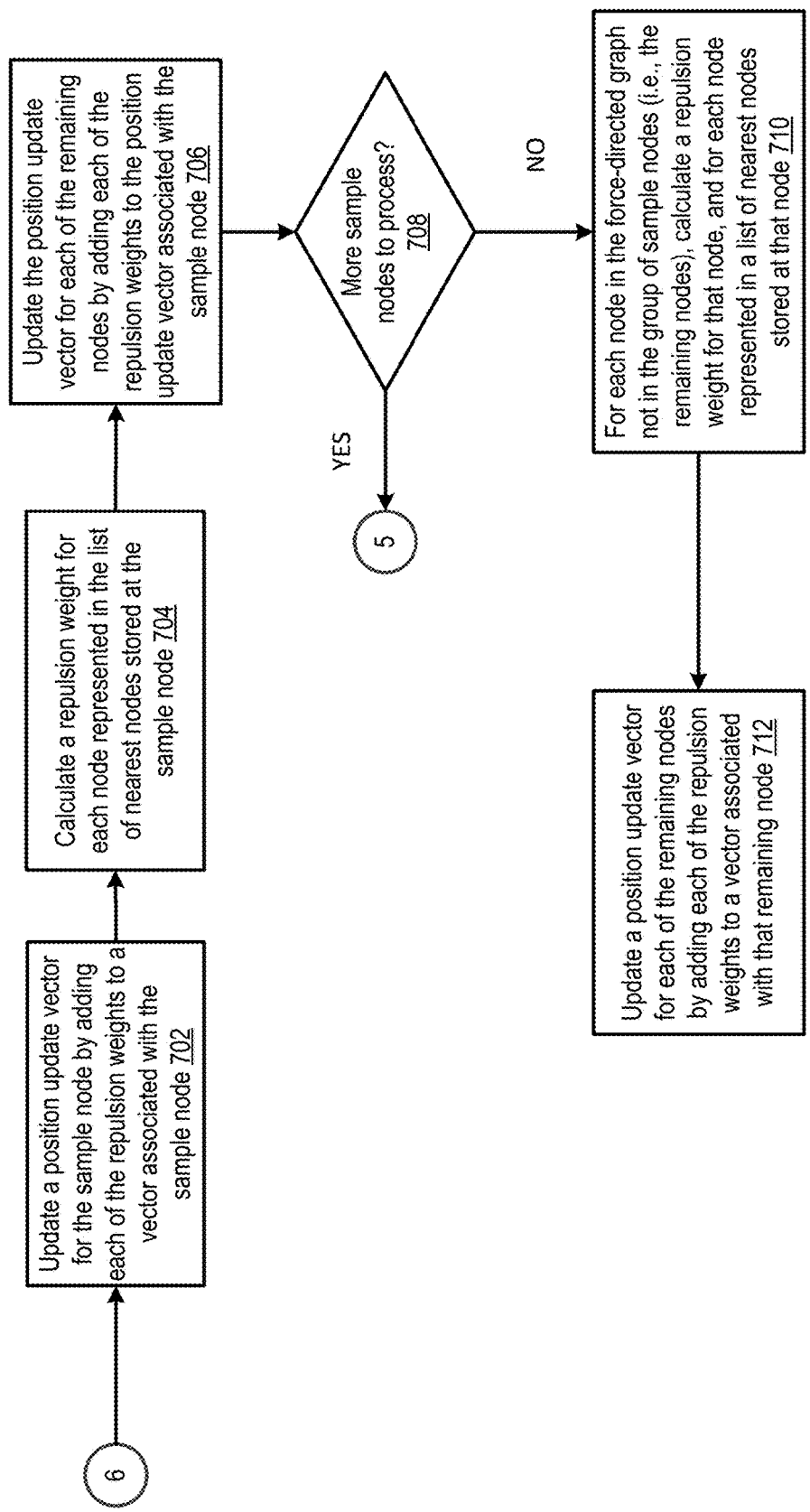

Referring to FIG. 7, the random-sampling graph generation device 102 can modify, at 702, a position update vector (e.g., node.vy and node.vx) for the sample node (i.e., selected at 610), based on the calculated repulsion weights between the sample node and each node from that random set of nodes. The random-sampling graph generation device 102 can also calculate 704 repulsion weights between that sample node and each node represented in the list of nearest nodes associated with that sample node. The random-sampling graph generation device 102 can update 706 the position update vector of the sample node (i.e., selected at 610) based on those repulsion weight calculations. In some implementations, updating the position update vector (e.g., node.vy and node.vx) based on the repulsion weights can include adding the value of the repulsion weights to the current values in the position update vector. In some instances, the position of the node in the graph (e.g., node.y and node.x) can then be updated based on the position update vector (e.g., node.vy and node.vx).

The random-sampling graph generation device 102 can check to determine whether or not there are other sample nodes to process, at 708 (e.g., other sample nodes for which repulsion weights can be calculated as selected at 608), and can continue to calculate repulsion weights, and/or to update the position update vectors of those sample nodes. When each of the sample nodes has been processed, the random-sampling graph generation device 102 can, for each node in the force-directed graph 110 that is not included in the set of sample nodes, update, at 710 the repulsion forces for those nodes (e.g., using the computeConstantRepulsion function described above). Specifically, a list of nearest nodes associated with that node can be updated (similar to the update described with respect to steps 612-618). The random-sampling graph generation device 102 can then calculate repulsion weights for that node, and for each node represented in the updated list of nearest nodes associated with that node. For example, each node in the force-directed graph 110 that is not included in the set of sample nodes can be stored and/or referenced in a constant update array and the random-sampling graph generation device 102 can calculate repulsive force weights for each node in the constant update array, as well as for each node in the nearest neighbor list for that node. The random-sampling graph generation device 102 can then update, at 712, a position update vector (e.g., node.vy and node.vx) associated with that node, e.g., by adding the calculated repulsion weights to the position update vector values of that node. In this manner, the random-sampling graph generation device 102 can calculate updated position data (e.g., node.y and node.x) for nodes not in the set of sample nodes, by reusing the calculations used in the previous position update calculations. Specifically, in some instances, different from the update position vector for the nodes in the set of sample nodes, the updated position vector (e.g., node.vy and node.vx) of each node for nodes not in the set of sample nodes is not be reinitialized prior to calculating repulsive force weights for each node. Thus, an updated position vector of a given node not in the set of sample nodes can include the values calculated for that node when the updated position vector of that node was last updated, such that subsequent modifications to the updated position vector of that node can be influenced by previous modifications to the updated position vector.

Figure 8:
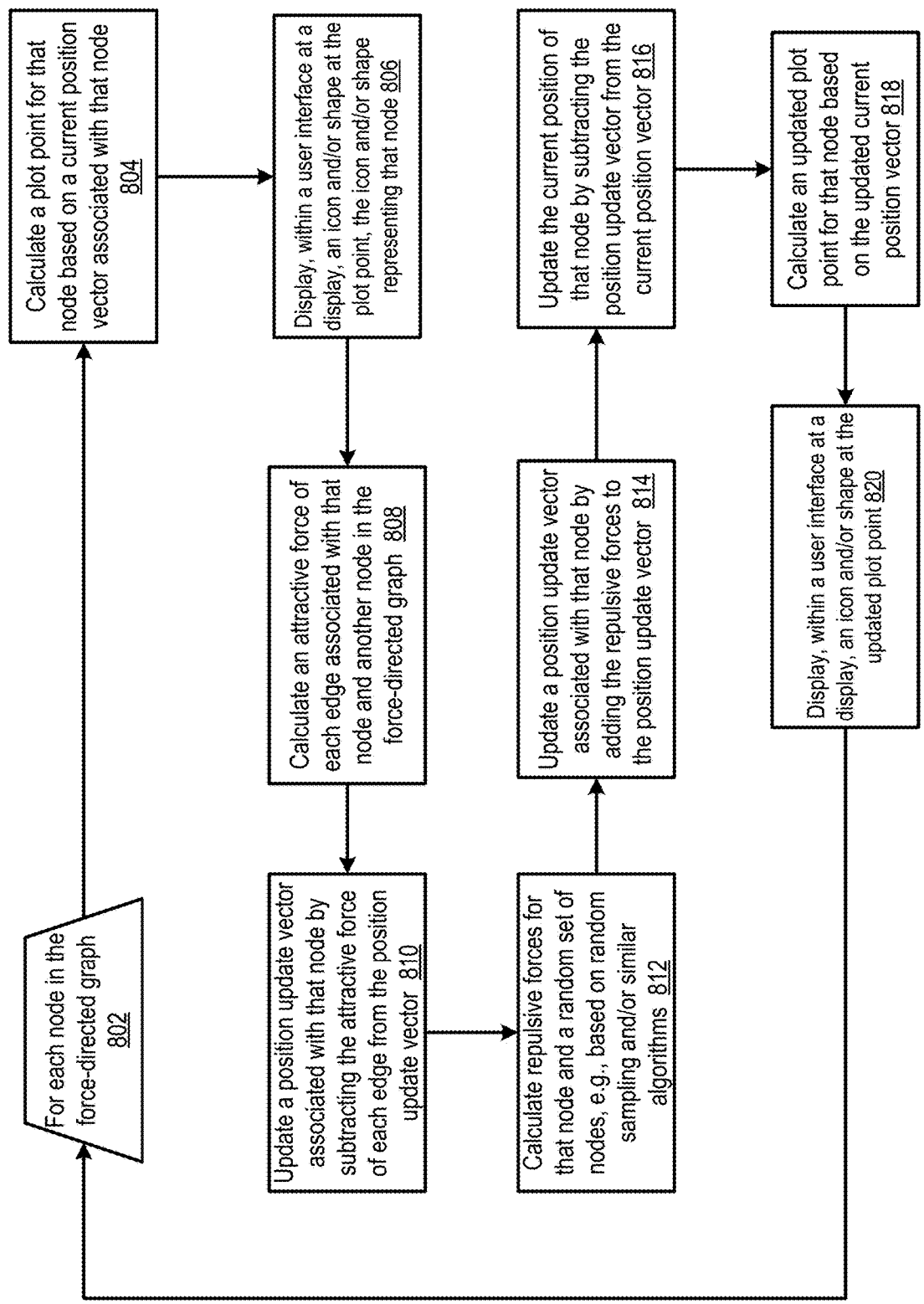
FIG. 8 is a logic flow diagram illustrating rendering a force-directed graph using forces, according to an embodiment.

FIG. 8 is a logic flow diagram illustrating rendering a force-directed graph 110 using forces. For example, in some implementations, for each node, at 802, in the force-directed graph 110, the random-sampling graph generation device 102 can (e.g., via the at least one processor 104) calculate, at 804, a plot point for that node, e.g., based on a current position vector associated with that node. In some instances, the current position vector for each can be randomly defined at initialization and can be updated during each iteration of an update function (e.g., as described above). For example, each value in the current position vector of a given node can correspond to a portion of a coordinate for displaying a representation of the node in the force-directed graph interface 112 rendered on the display apparatus 118 (e.g., a first value in the current position vector can correspond to an x-axis coordinate for the representation of the node, a second value in the current position vector can correspond to a y-axis coordinate for the representation of the node, and/or the like). In other implementations, the current position vector can include multiple values associated with repulsive force weights associated with the node, and/or attractive force weights associated with edges connected to that node, and the random-sampling graph generation device 102 can translate those values into coordinate values. The random-sampling graph generation device 102 can display, at 806, within the force-directed graph interface 112 at the display apparatus, an icon and/or shape at the plot point. The icon and/or shape can represent the node within the force-directed graph 110.

The random-sampling graph generation device 102 can calculate, at 808, an attractive force of each edge associated with that node and another node in the force-directed graph 110, and can update, at 810, a position update vector associated with that node by subtracting the attractive forces of each of the edges from the position update vector associated with that node. The random-sampling graph generation device 102 can also calculate, at 812, repulsive forces, e.g., based on random sampling of nodes so as to randomly calculate repulsive forces for those nodes (e.g., see FIGS. 5-7). The random-sampling graph generation device 102 can update, at 814, a position update vector associated with that node, e.g., by adding the calculated repulsive forces to the position update vector associated with that node. The random-sampling graph generation device 102 can then update, at 816, a current position of the representation of that node, by subtracting the position update vector from the current position vector associated with that node. The random-sampling graph generation device 102 can calculate an updated plot point, at 818, for the representation of that node, e.g., based on the updated current position vector. The random-sampling graph generation device 102 can then display, at 820, within the force-directed graph interface 112 at the display apparatus, an icon and/or shape at the updated plot point. In some implementations, for example, the random-sampling graph generation device 102 can provide the updated plot point to the display apparatus, so that the display apparatus moves the original icon and/or shape that represents that node in the force-directed graph interface 112, so that the original icon and/or shape is rendered at the updated plot point. The random-sampling graph generation device 102 can iteratively repeat the calculating and updating of plot points for rendering icons and/or shapes representing each of the nodes in the force-directed graph 110 until a criterion is met or satisfied (e.g., until a portion and/or each of the nodes in the force-directed graph 110 does not update its nearest node list after a predetermined number of repetitions, until the repulsive force weights of a portion and/or each of the nodes in the force-directed graph converge, after a number of iterations reaches a threshold, until the calculating and updating has repeated a predetermined number of times, until an amount of change in the updated position of each node during a given iteration is less than a predetermined threshold, and/or similar criteria).

Figure 9:
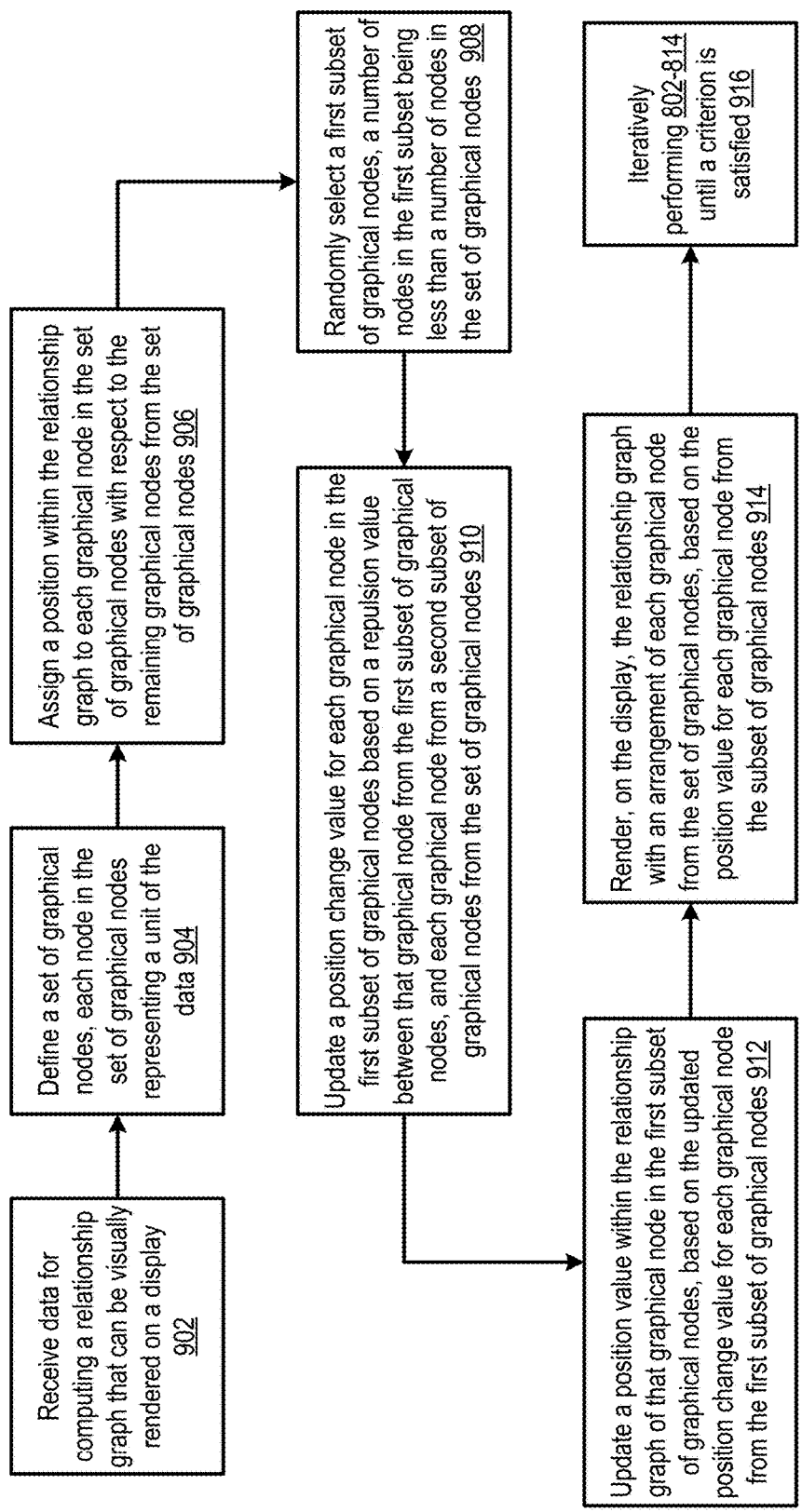
FIG. 9 is a logic flow diagram illustrating updating a force-directed graph representation, according to an embodiment.

FIG. 9 is a logic flow diagram illustrating updating a force-directed graph 110 representation. For example, in some implementations, the random-sampling graph generation device 102 can (e.g., via the at least one processor 104) receive, at 902, data for computing a relationship graph (e.g., the force-directed graph 110) that can be visually rendered on a display (e.g., display apparatus). The random-sampling graph generation device 102 can define, at 904, a set of graphical nodes, such that each node in the set of graphical nodes represents a unit and/or portion of the data. The random-sampling graph generation device 102 can assign, at 906, a position within the relationship graph to each graphical node in the set of graphical nodes, with respect to the remaining graphical nodes from the set of graphical nodes. The random-sampling graph generation device 102 can randomly select, at 908, a first subset of graphical nodes, such that a number of nodes in the first subset of graphical nodes is less than a number of nodes in the set of graphical nodes. The random-sampling graph generation device 102 can update, at 910, a position change value for each graphical node in the first subset of graphical nodes, e.g., based on a repulsion value between that graphical node from the first subset of graphical nodes, and each graphical node from a second subset of graphical nodes from the set of graphical nodes. The random-sampling graph generation device 102 can update, at 912, a position value within the relationship graph of that graphical node in the first subset of graphical nodes, e.g., based on the updated position change value for each graphical node from the first subset of graphical nodes. The random-sampling graph generation device 102 can render, at 914, on the display, the relationship graph (e.g., as an arrangement of each graphical node from the set of graphical nodes), based on the position value for each graphical node from the subset of graphical nodes. The random-sampling graph generation device 102 can iteratively, at 916 receive data, determine and/or update position data, and render the graphical nodes of the relationship graph (e.g., can iteratively repeat 902-914), until a criterion is satisfied.

Figure 10:
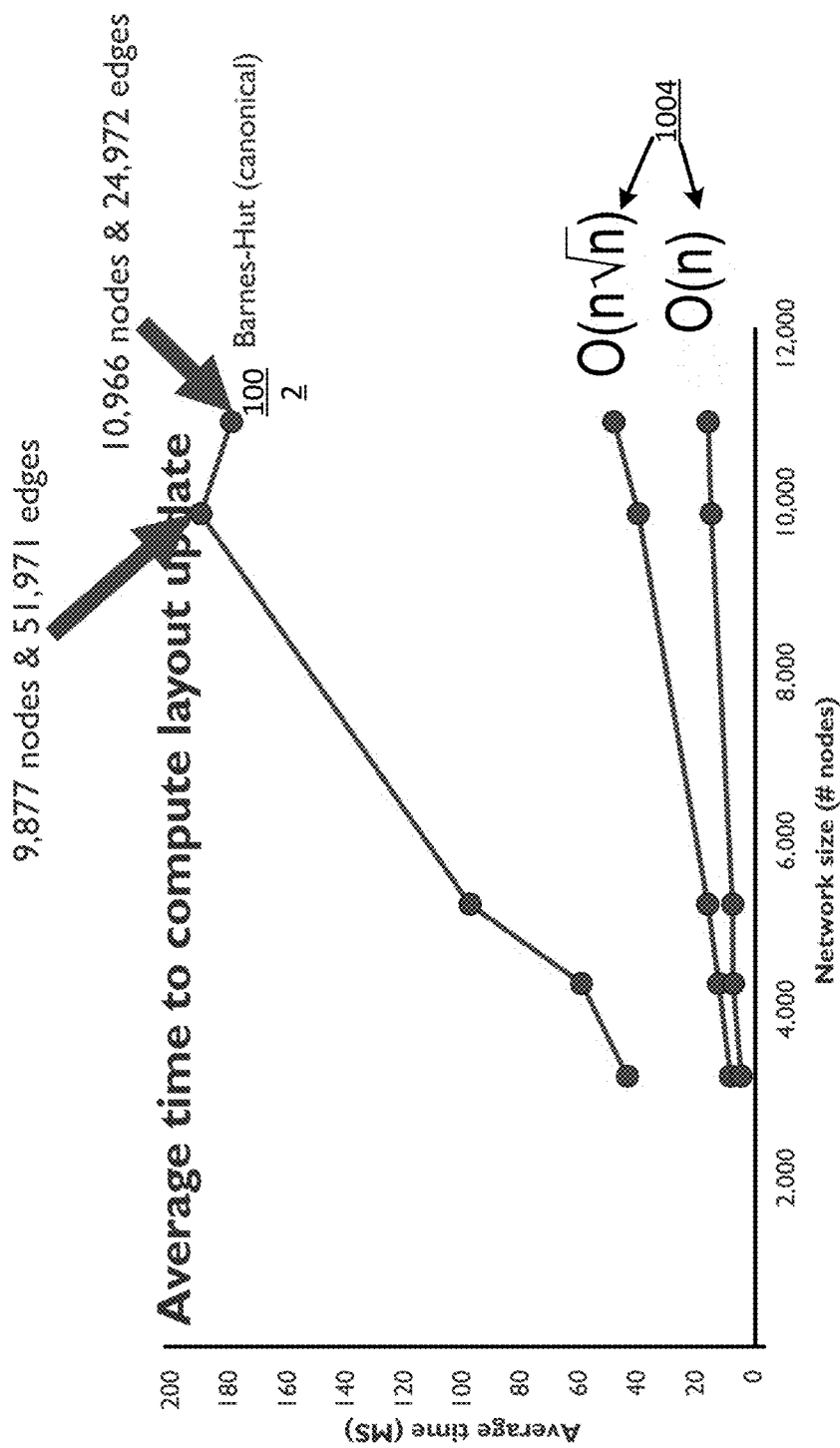
FIG. 10 is a diagram illustrating time saved processing force-directed graph nodes, using the embodiments described herein.

FIG. 10 is a diagram illustrating time saved processing force-directed graph nodes. For example, the apparatus and methods described herein allow for drawing a graph (e.g., in two dimensions) such that updates may be viewed substantially in real-time, and such that they are displayed in a manner that allows for a user to quickly visually analyze the graph. A naïve force-directed graph algorithm (e.g., a force-directed graph algorithm that does not use random sampling as described herein) can result in a process with a complexity of $O(n^2+m)$. Some improved algorithms, such as the Barnes-Hut canonical filter 1002, can have a complexity of $O(n*\log n+m)$. The above-described random-sampling force-directed graph embodiments, on the other hand, can have a complexity of $O(\sqrt{n})$ with respect to the randomly-sampled nodes, and a complexity of $O(1)$ with respect to the remaining unsampled nodes (as calculating the updated positions of these values involves using the values previously calculated for those nodes). Together 1004, and depending on the size of the nearest nodes list associated with each of the nodes, the embodiments described herein can ultimately have a complexity of $O(n\sqrt{n})$ or $O(n)$, causing the average time for updating a force-directed graph 110 to be reduced substantially from other algorithms, e.g., such as the Barnes-Hut canonical filter algorithm. For example, the amount of time that it can take to update the force-directed graph 110 using the embodiments described herein can take less than a third of the time required to perform the Barnes-Hut algorithm over the same number of nodes. Thus, the embodiments described herein can not only substantially reduce the amount of data processed, but can also substantially reduce the amount of time for updating nodes in the force-directed graph 110. Such improvements can allow a random-sampling graph generation device 102 to run and/or process force-directed graphs 110 more efficiently.

While methods and apparatuses described above are described as being used for force-directed graphs, in other implementations, methods and apparatuses described herein can be used within any n-body simulation, including but not limited to, for example, gravitational simulations, the evolution of star clusters, the interactions of subatomic particles and/or the like. For example, in other implementations, the methods and apparatuses described herein can be used with other models and/or data structures that can be used to classify, arrange and/or display large quantities of data.

It is intended that the systems and methods described herein can be performed by software (stored in memory and/or executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including Unix utilities, C, C++, Java™, Ruby, SQL, SAS®, the R programming language/software environment, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code. Each of the devices described herein can include one or more processors as described above.

Some embodiments described herein relate to devices with a non-transitory computer-readable medium (also can be referred to as a non-transitory processor-readable medium or memory) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

While various embodiments have been described above, it should be understood that they have been presented by way of example only, and not limitation. Where methods and steps described above indicate certain events occurring in certain order, the ordering of certain steps may be modified. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein. Furthermore, although various embodiments are described as having a particular entity associated with a particular compute device, in other embodiments different entities can be associated with other and/or different compute devices.

What is claimed is:

1. An apparatus, comprising:
a memory; and
a processor operatively coupled to the memory, the processor configured to receive data,
the processor configured to compute, based on the data, a relationship graph to be visually rendered on a display communicatively coupled with the processor,
the processor configured to define a set of graphical nodes each representing a unit of the data,
the processor configured to initialize a list of nearest nodes for each graphical node from the set of graphical nodes,
the processor configured to calculate a node quantity (1) based on a number of nodes in the set of graphical nodes and (2) less than the number of nodes in the set of graphical nodes,
the processor configured to randomly select a first subset of graphical nodes from the set of graphical nodes, a number of nodes in the first subset of graphical nodes corresponding to the node quantity,
the processor configured to update, for each graphical node from the first subset of graphical nodes, the list of nearest nodes specific to that graphical node by replacing in the list of nearest nodes a representation of at least one graphical node from the set of graphical nodes with a representation of another graphical node from the set of graphical nodes;
the processor configured to update a position change value for each graphical node from the first subset of graphical nodes based on a repulsion value between that graphical node from the first subset of graphical nodes and each graphical node from a second subset of graphical nodes from the set of graphical nodes,
the processor configured to update, based on the position change value for each graphical node from the first subset of graphical nodes, a position value within the relationship graph of that graphical node,
the processor configured to render, after a criterion is satisfied, on the display the relationship graph with an arrangement of each graphical node from the set of graphical nodes based on the position value for each graphical node from the first subset of graphical nodes,
the processor configured to not update, for each graphical node from the first subset of graphical nodes, the list of nearest nodes specific to that graphical node when the criterion is satisfied.

2. The apparatus of claim 1, wherein the processor is configured to randomly and independently select the second subset of graphical nodes from the set of graphical nodes.

3. The apparatus of claim 1, wherein the second subset of graphical nodes for each graphical node from the set of graphical nodes includes each graphical node from the set of graphical nodes not within the first subset of graphical nodes.

4. The apparatus of claim 1, wherein the processor is configured to randomly assign a position within the relationship graph to each graphical node from the set of graphical nodes prior to the updating the position change value for each graphical node from the first subset of graphical nodes.

5. The apparatus of claim 1, wherein the processor is configured to define a third subset of graphical nodes including each node from the set of graphical nodes not within the first subset of graphical nodes, each graphical node from the third subset of graphical nodes having an associated precalculated position change value,
the processor configured to update, within the relationship graph, a position value for each graphical node from the third subset of graphical nodes based on the precalculated position change value for that graphical node,
the processor configured to render on the display the relationship graph with the arrangement of each graphical node from the set of graphical nodes based on the position value for each graphical node from the third subset of graphical nodes.

6. The apparatus of claim 1, wherein the processor is configured to define a plurality of edges such that each graphical node from the set of graphical nodes is connected, by at least one edge from the plurality of edges, to at least one further graphical node from the set of graphical nodes, each edge from the plurality of edges representing an association between (1) a first graphical node from the set of graphical nodes and (2) a second graphical node from the set of graphical nodes and connected to the first graphical node by that edge,
the processor configured to compute an attraction value for each edge from the plurality of edges,
the processor configured to update, prior to updating the position value within the relationship graph, the position change value for each graphical node from the first subset of graphical nodes based on the attraction value associated with each edge from the plurality of edges associated with that graphical node from the first subset of graphical nodes.

7. The apparatus of claim 1, wherein at least one node in the set of graphical nodes is associated with a malware sample file.

8. The apparatus of claim 1, wherein the processor is configured to update the list of nearest nodes before updating the position change value for each graphical node from the first subset of graphical nodes.

9. The apparatus of claim 1, wherein the node quantity includes a square root of the number of nodes in the set of graphical nodes.

10. The apparatus of claim 1, wherein each graphical node from the second subset of graphical nodes is a graphical node from the list of nearest nodes specific to that graphical node.

11. A non-transitory processor-readable medium storing code representing instructions to be executed by a processor, the code comprising code to cause the processor to:
receive data;
compute, based on the data, a relationship graph to be visually rendered on a display of a compute device;
define a set of graphical nodes each representing a unit of the data;
initialize a list of nearest nodes for each graphical node from the set of graphical nodes;
assign a position within the relationship graph to each graphical node from the set of graphical nodes with respect to the remaining graphical nodes from the set of graphical nodes;
calculate a node quantity (1) based on a number of nodes in the set of graphical nodes and (2) less than the number of nodes in the set of graphical nodes,
randomly select a first subset of graphical nodes from the set of graphical nodes, a number of nodes in the first subset of graphical nodes corresponding to the node quantity;
for each graphical node from the first subset of graphical nodes:
update the list of nearest nodes specific to that graphical node by replacing in the list of nearest nodes a representation of at least one graphical node from the set of graphical nodes with a representation of another graphical node from the set of graphical nodes;
update a position change value for that graphical node from the first subset of graphical nodes based on a repulsion value between (1) that graphical node from the first subset of graphical nodes and (2) each graphical node from a second subset of graphical nodes from the set of graphical nodes; and
update, based on the position change value for that graphical node from the first subset of graphical nodes, the position within the relationship graph of that graphical node to define an updated position within the relationship graph for that graphical node; and
render, after a criterion is satisfied, on the display of the compute device the relationship graph with an arrangement of each graphical node from the set of graphical nodes based on the updated position within the relationship graph for each graphical node from the first subset of graphical nodes, the list of nearest nodes specific to each graphical node from the first set of graphical nodes is not updated when the criterion is satisfied.

12. The non-transitory processor-readable medium of claim 11, further comprising code to cause the processor to:
randomly and independently select the second subset of graphical nodes from the set of graphical nodes.

13. The non-transitory processor-readable medium of claim 11, wherein the second subset of graphical nodes for each graphical node from the first subset of graphical nodes is equivalent to the remaining graphical nodes from first subset of graphical nodes.

14. The non-transitory processor-readable medium of claim 11, further comprising code to cause the processor to:
iteratively perform the randomly selecting, the updating the position change value, and the updating the position within the relationship graph, until the criterion is met.

15. The non-transitory processor-readable medium of claim 11, further comprising code to cause the processor to:
define a third subset of graphical nodes including each node from the set of graphical nodes not within the first subset of graphical nodes; and
for each graphical node from the third subset of graphical nodes, update the position within the relationship graph of that graphical node based on a previously calculated position change value for that graphical node to define an updated position within the relationship graph for that graphical node, the code to cause the processor to render includes code to cause the processor to render on the display of the compute device the relationship graph with the arrangement of each graphical node from the set of graphical nodes based on the updated position within the relationship graph for each graphical node from the third subset of graphical nodes.

16. The non-transitory processor-readable medium of claim 11, wherein the code to cause the processor to assign includes code to cause the processor to randomly assign the position within the relationship graph to each graphical node from the set of graphical nodes.

17. The non-transitory processor-readable medium of claim 11, further comprising code to cause the processor to:
define a plurality of edges such that each graphical node from the set of graphical nodes is connected, by at least one edge from the plurality of edges, to at least one further graphical node from the set of graphical nodes, each edge from the plurality of edges representing an association between (1) a first graphical node from the set of graphical nodes and (2) a second graphical node from the set of graphical nodes and connected to the first graphical node by that edge;
compute an attraction value for each edge from the plurality of edges; and
prior to updating the position within the relationship graph, update the position change value for each graphical node from the first subset of graphical nodes based on the attraction value associated with each edge from the plurality of edges associated with that graphical node from the first subset of graphical nodes.

18. The non-transitory processor-readable medium of claim 11, wherein each graphical node from the second subset of graphical nodes is a graphical node from the list of nearest nodes specific to that graphical node.

19. A method, comprising:
repeatedly optimizing a visual rendering of a relationship graph having a set of edges and a set of graphical nodes, where each graphical node from the set of graphical nodes has a list of nearest nodes, until a criterion is satisfied based on iteratively performing:
computing an attraction value for each edge from the set of edges, each edge from the set of edges representing an association between two graphical nodes from the set of graphical nodes, each graphical node from the set of graphical nodes being associated with a position change value, each graphical node from the set of graphical nodes representing a unit within the relationship graph;
calculating a node quantity (1) based on a number of nodes in the set of graphical nodes and (2) less than the number of nodes in the set of graphical nodes,
selecting a first subset of graphical nodes from the set of graphical nodes, a number of nodes in the first subset of graphical nodes corresponding to the node quantity;
updating, for each graphical node from the first subset of graphical nodes, the list of nearest nodes specific to that graphical node by replacing in the list of nearest nodes a representation of at least one graphical node from the set of graphical nodes with a representation of another graphical node from the set of graphical nodes;
updating the position change value for each graphical node from the first subset of graphical nodes based on (1) the attraction value for each edge from the set of edges and associated with that graphical node from the first subset of graphical nodes and (2) a repulsion value between that graphical node from the first subset of graphical nodes and each graphical node from a second subset of graphical nodes from the set of graphical nodes;
updating the position change value for each graphical node from the set of graphical nodes not within the first subset of graphical nodes based on the attraction value for each edge from the set of edges associated with that graphical node;
updating, based on the position change value for each graphical node from the set of graphical nodes, a position value within the relationship graph of that graphical node; and
rendering, after the criterion is satisfied, on a display of a compute device the relationship graph with an arrangement of each graphical node from the set of graphical nodes based on the position value within the relationship graph for each graphical node from the set of graphical nodes, the list of nearest nodes specific to each graphical node from the set of graphical nodes is not updated when the criterion is satisfied.

20. The method of claim 19, wherein the criterion is a predetermined number of iterations.

21. The method of claim 19, wherein the criterion is satisfied when an amount of change in the updated position of each graphical node from the set of graphical nodes for an iteration is less than a predetermined threshold.

22. The method of claim 19, further comprising:
randomly and independently selecting the second subset of graphical nodes from the set of graphical nodes.

23. The method of claim 19, wherein the second subset of graphical nodes for each graphical node from the set of graphical nodes includes each graphical node from the set of graphical nodes not within the first subset of graphical nodes.

24. The method of claim 19, wherein the selecting includes randomly selecting the first subset of graphical nodes from the set of graphical nodes.

25. The method of claim 19, wherein each graphical node from the second subset of graphical nodes is a graphical node from the list of nearest nodes specific to that graphical node.

26. The method of claim 19, wherein the criterion is satisfied when repulsive force weights of each graphical node from the set of graphical nodes converge.

* * * * *

UNITED STATES PATENT AND TRADEMARK OFFICE
CERTIFICATE OF CORRECTION

PATENT NO. : 10,565,749 B1
APPLICATION NO. : 15/179629
DATED : February 18, 2020
INVENTOR(S) : Robert Paul Gove, Jr.

Page 1 of 1

It is certified that error appears in the above-identified patent and that said Letters Patent is hereby corrected as shown below:

On the Title Page

Item (72), "Robert Paul Gove," should read -- Robert Paul Gove Jr. --

Signed and Sealed this
Nineteenth Day of May, 2020

Andrei Iancu
*Director of the United States Patent and Trademark Office*